US008651951B2

(12) United States Patent
Takushima (10) Patent No.: US 8,651,951 B2
(45) Date of Patent: Feb. 18, 2014

(54) GAME PROCESSING SERVER APPARATUS (71) Applicant: DeNA Co., Ltd., Tokyo (JP)

(72) Inventor: Nobutaka Takushima, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/747,015

(22) Filed: Jan. 22, 2013

(65) Prior Publication Data

US 2013/0288800 A1  Oct. 31, 2013

(30) Foreign Application Priority Data

Apr. 27, 2012  (JP) ................. 2012-103453

(51) Int. Cl.
*G07F 17/32* (2006.01)
(52) U.S. Cl.
USPC ............................................. 463/31; 463/42
(58) Field of Classification Search
USPC ........................................ 463/29, 31, 40–44
See application file for complete search history.

(56) References Cited

U.S. PATENT DOCUMENTS

2010/0227685 A1* 9/2010 Mori ............................... 463/30

FOREIGN PATENT DOCUMENTS

JP    06-327835    11/1994
JP    2007-215795   8/2007

OTHER PUBLICATIONS

Japanese Office Action mailed Jul. 24, 2012.

* cited by examiner

*Primary Examiner* — Omkar Deodhar
(74) *Attorney, Agent, or Firm* — IPUSA, PLLC (57) ABSTRACT

A game processing server apparatus connected to a terminal device via a network, includes a request accepting unit which accepts a request including player identification data and operation identification data related to the operation of the player from the terminal device; a screen transition information obtaining unit which obtains screen transition information in which display control content of a series of screens in accordance with a processed result of the accepted request is described for updating screen transition information accompanied by a game application program of the terminal device, wherein the obtained screen transition information includes an event string in which events corresponding to screens are aligned, and each of the events includes data to specify content of the screen, and a branch condition and an event string which is to occur after the branch condition is satisfied.

5 Claims, 10 Drawing Sheets

| PLAYER ID | STATUS | ICON DATA | PLAYER NAME | FRIEND PLAYER ID | ATTRIBUTE | OBTAINED NORMAL SCROLL | READ NORMAL SCROLL | OBTAINED RARE SCROLL | READ RARE SCROLL | ⋮ |
|---|---|---|---|---|---|---|---|---|---|---|
| 1 | 16 | ICON DATA #1 | aaa | 5, 8 | TIGER | A, D | A, D | F | — | ⋮ |
| 2 | 1 | ICON DATA #2 | bbb | NONE | CROW | B, C, D | B, D | — | — | ⋮ |
| 3 | 53 | ICON DATA #3 | ccc | 4, 6 | SHARK | A, B, C, D, E | A, B, C, D | F, G, H | F, G, H | ⋮ |
| 4 | 24 | ICON DATA #4 | ddd | 3, 6 | TIGER | D | D | G, I | G, I | ⋮ |
| 5 | 31 | ICON DATA #5 | eee | 1, 6 | CROW | — | — | F, J | J | ⋮ |
| 6 | 67 | ICON DATA #6 | fff | 3, 4, 5 | SHARK | A, B, C, D, E | A, B, C, D, E | F, G, H, I, J | F, G, H, I, J | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

GAME PROCESSING SERVER APPARATUS

BACKGROUND OF THE INVENTION

1. Field of the Invention

The present invention relates to a game processing server apparatus.

2. Description of the Related Art

A social game is provided in a social networking service (SNS), and is an online game in which a player plays the game while having communications with other players. Thus, the terminal device by which the player plays the game is not independently operated but instead is configured to send a request to a server apparatus at a predetermined timing to obtain data and reflect the obtained data to the progression of the game.

There are two major types of processing the social game, including a "browser type" and an "application type".

For the browser type, the server manages screen transition information (View information) in which display control content of a series of screens in accordance with a processing of the game is described. Then, the server sends data such as a HTML data document and images or the like corresponding with the HTML data document to the terminal device in response to the request for obtaining data upon an input operation to the terminal device. Then, the data is displayed by the web browser of the terminal device.

For the application type, game application software (application program) is previously downloaded to the terminal device from the server and stored in the terminal device. Then, the game application software is executed by the terminal device so that screen information is generated based on screen transition information included in the game application software and data obtained from the server upon an input operation.

For the browser type, as a general-purpose web browser is used, there is an advantage in that it is unnecessary to download specific game application software. However, as all the data for displaying the screen are obtained from the server, the traffic amount becomes large. Thus, in a view point of reducing the traffic, the application type is preferable.

As described above, for the application type, only the data for communication with the other players is transmitted between the server and the terminal device, there is an advantage in that the traffic can be reduced.

However, in a conventional application type game processing, as the game application software generates the screen transition information based on the screen transition information previously included in the game application software stored in the terminal device, a dynamic process in response to an individual request, such as varying a layout of the screen in response to the individual request or the like, cannot be performed.

SUMMARY OF THE INVENTION

The present invention is made in light of the above problems, and provides a game processing technique which basically processes a social game by an application type and is capable of dynamically generating screen information similar to a browser type.

According to an embodiment, there is provided a game processing server apparatus connected to a terminal device via a network, including a request accepting unit which accepts a request from the terminal device which is generated under control of a game application program executed in the terminal device upon an operation of a player of the terminal device, the request including player identification data and operation identification data related to the operation of the player; a referring unit which updates or refers to player information stored in a player information database based on the accepted request; a status obtaining unit which obtains a status of the player from the player information database based on the player identification data; a screen transition information obtaining unit which obtains screen transition information in which display control content of a series of screens in accordance with a processed result of the accepted request is described for updating screen transition information accompanied by the game application program of the terminal device from scenario information stored in a scenario information storing unit based on the operation identification data and the status; and a sending unit which sends the processed result of the accepted request and the obtained screen transition information to the terminal device which has sent the request, wherein the obtained screen transition information includes an event string in which events corresponding to screens are aligned, and each of the events includes data to specify content of the screen, and for a case where a screen transition occurs in the event, a branch condition and an event string which is to occur after the branch condition is satisfied.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

Figure 1:
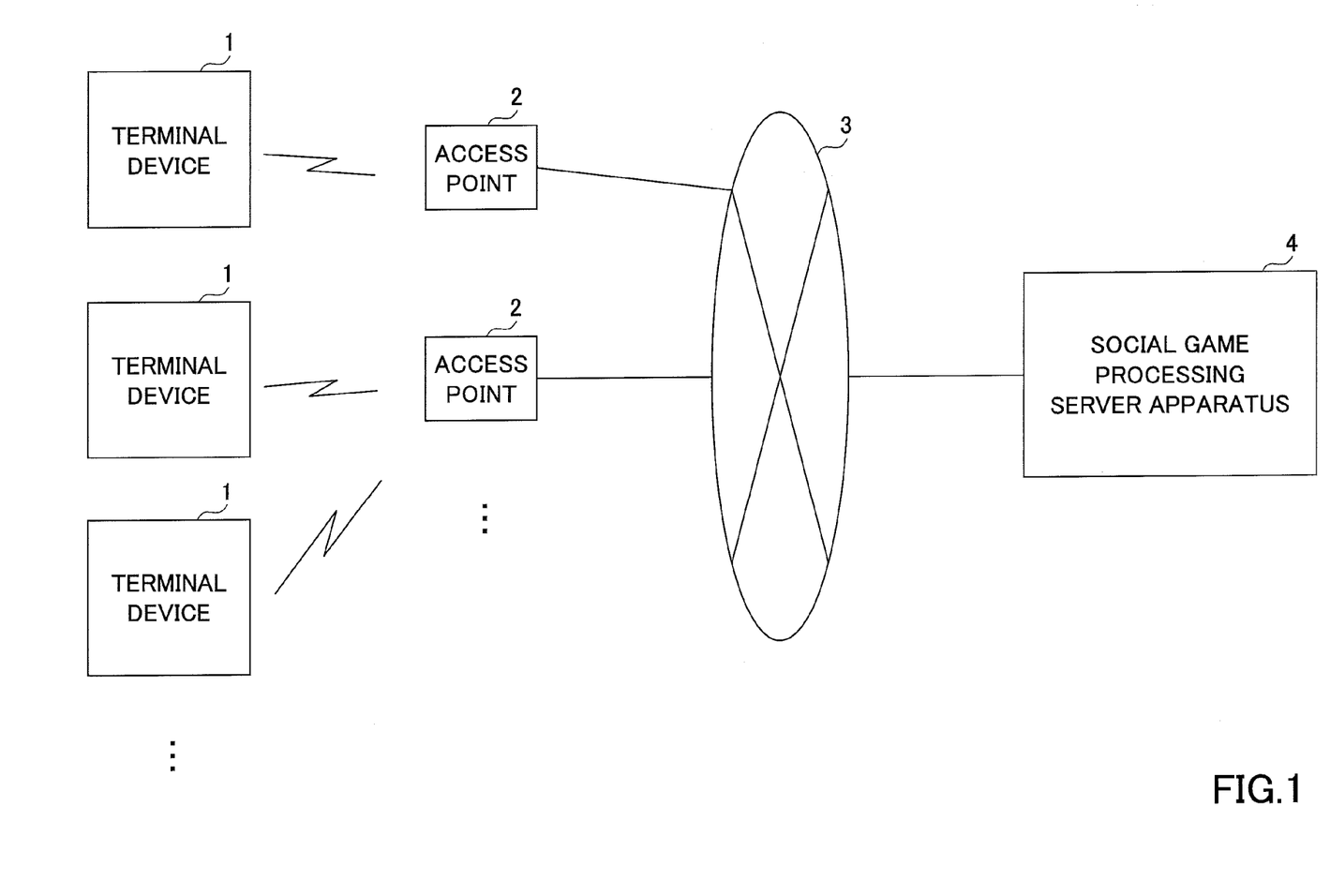
FIG. 1 is a block diagram showing a structure of an example of a system of an embodiment.

FIG. 1 is a block diagram showing a structure of an example of a system of an embodiment.

The system shown in FIG. 1 includes plural terminal devices 1 which belong to players (users), respectively, access points 2 such as a mobile base station, a Wi-Fi station or the like, a network 3 such as the INTERNET or the like, and a social game processing server apparatus 4. The social game processing server apparatus 4 controls processing of a social game (social network game) in which plural players play a game via the network 3. The terminal device 1 may be a smart phone, a mobile phone, or the like.

Figure 2:
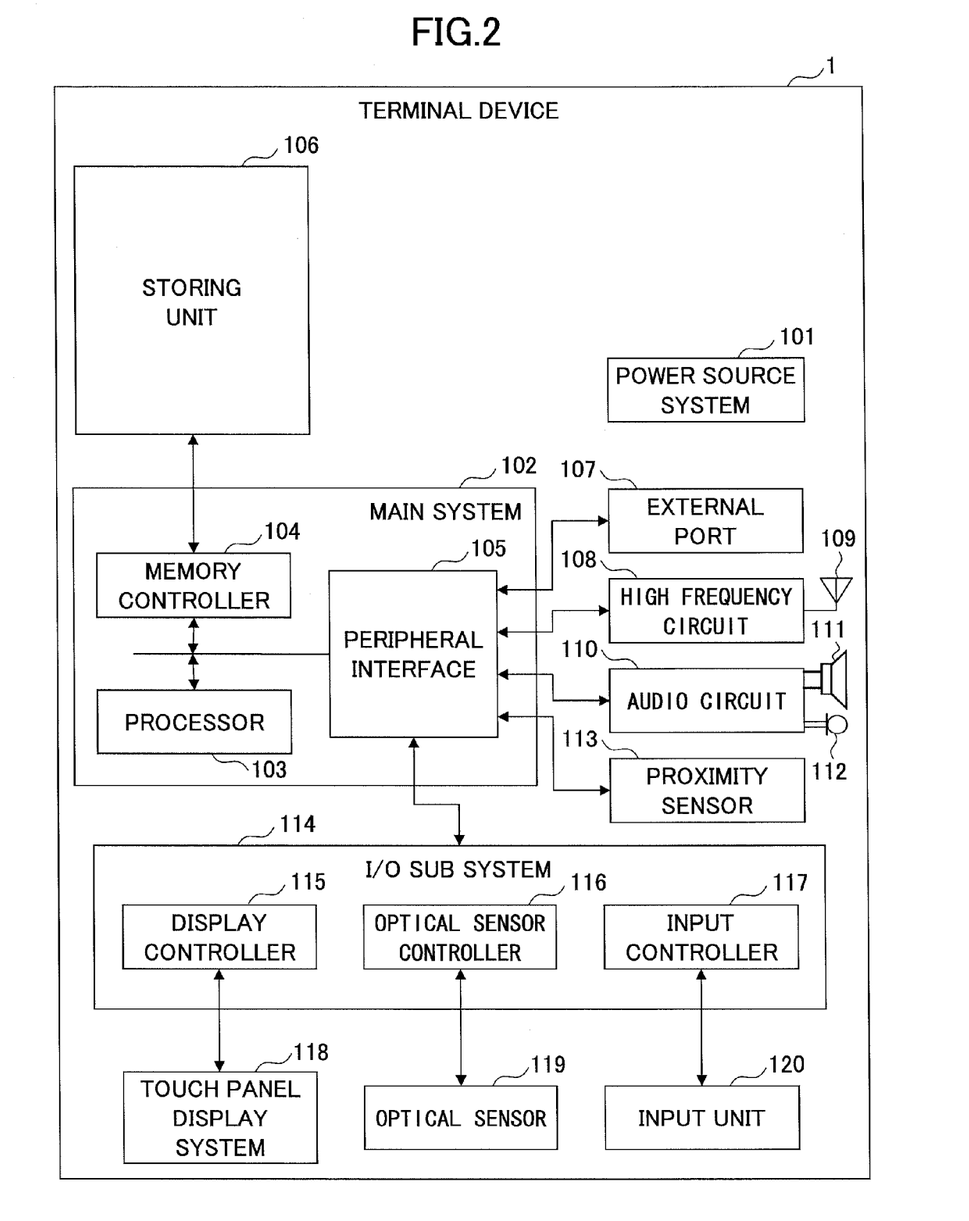
FIG. 2 is a block diagram showing an example of a hardware structure of a terminal device.

FIG. 2 is a block diagram showing an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116, and an input controller 117.

Figure 3:
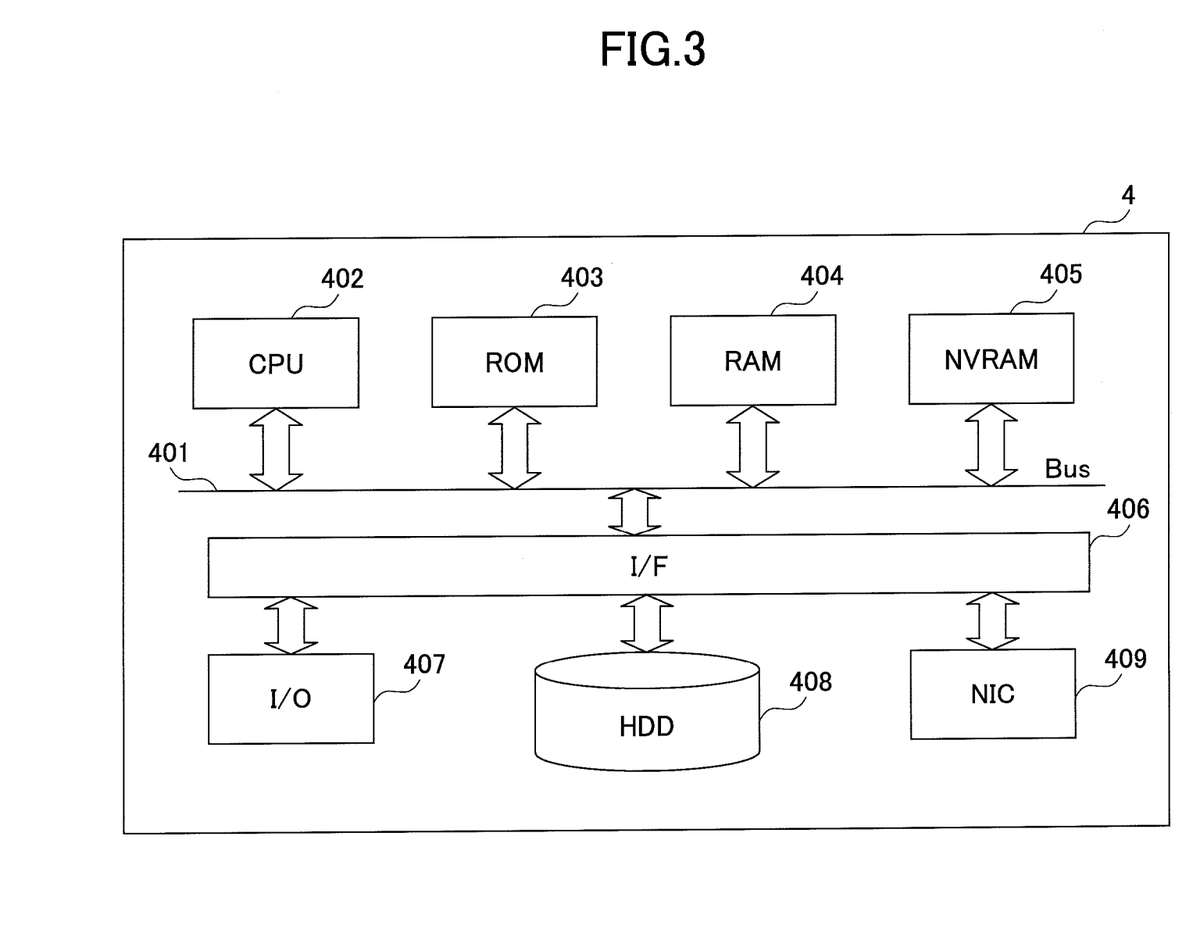
FIG. 3 is a block diagram showing an example of a hardware structure of a social game processing server apparatus.

FIG. 3 is a block diagram showing an example of a hardware structure of the social game processing server apparatus 4.

The social game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

Figure 4:
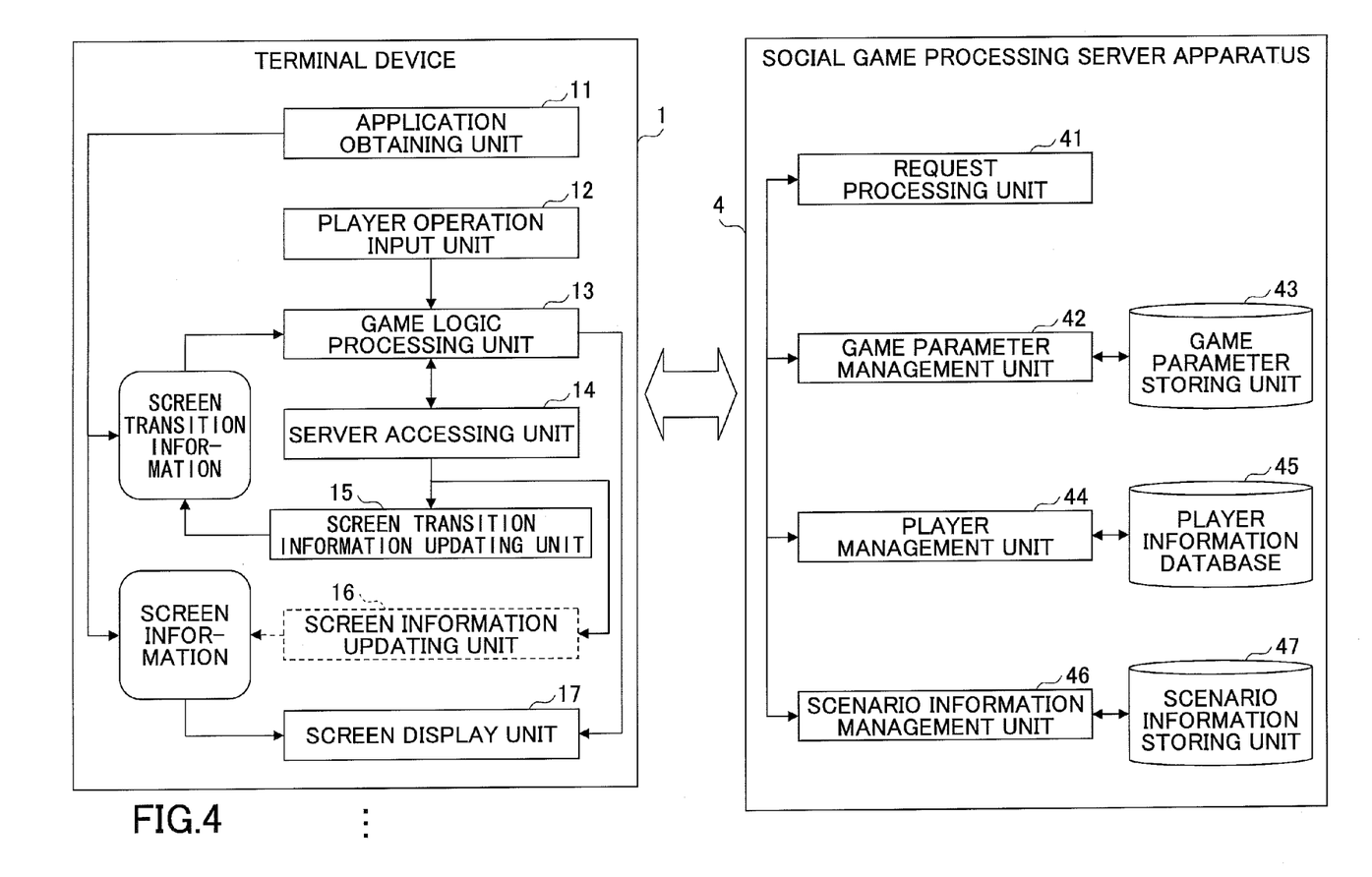
FIG. 4 is a block diagram showing an example of a functional structure of the terminal device and the social game processing server apparatus.

FIG. 4 is a block diagram showing an example of a functional structure of the terminal device 1 and the social game processing server apparatus 4.

In FIG. 4, the terminal device 1 includes an application obtaining unit 11, a player operation input unit 12, a game logic processing unit 13, a server accessing unit 14, a screen transition information updating unit 15, a screen information updating unit 16, and a screen display unit 17.

The application obtaining unit 11 downloads game application software (program) from a download server, not shown in the drawings. The player operation input unit 12, the game logic processing unit 13, the server accessing unit 14, the screen transition information updating unit 15, the screen information updating unit 16 and the screen display unit 17 are structured by the game application software with the functions of the hardware or the like of the terminal device 1. The application obtaining unit 11 has a function to store initial screen transition information and initial screen information in a predetermined memory area.

The player operation input unit 12 has a function to input (accept) an operation of a player (user) of the terminal device 1.

The game logic processing unit 13 has a function to process a game by transitioning screens based on screen transition information in accordance with the input operation by the player via the player operation input unit 12.

The server accessing unit 14 has a function to send a request to the social game processing server apparatus 4 when it is necessary to access the social game processing server apparatus 4 in a course of the processing by the game logic processing unit 13. Further, the server accessing unit 14 has a function to receive a processed result, screen transition information and the like as a response from the social game processing server apparatus 4. Here, the request includes a request of updating and a request of referring to data. The request of updating is a request for processing an operation including updating player information or the like. An example of the request for processing an operation including updating player information is such as "send item" by which the player sends an obtained item to another player. Thus, with this operation, it is necessary to update the player information. The request of referring to data is a request for processing an operation including referring to the player information such as "referring to obtained items" or the like.

The screen transition information updating unit 15 has a function to update (reflect) previously owned screen transition information when additional screen transition information is included in the response received by the server accessing unit 14 from the social game processing server apparatus 4.

The screen information updating unit 16 has a function to update (reflect) previously owned screen information when additional screen information is included in the response received by the server accessing unit 14 from the social game processing server apparatus 4. Here, in this embodiment, it is assumed that a game program is not included in the response from the social game processing server apparatus 4. Alternatively, the response may include the game program. In such a case, the previously obtained game program which operates the functional components (12 to 17 or the like) may be updated.

The screen display unit 17 has a function to display screens based on the screen information under control of the game logic processing unit 13.

The social game processing server apparatus 4 includes a request processing unit 41, a game parameter management unit 42, a game parameter storing unit 43, a player management unit 44, a player information database 45, a scenario information management unit 46, and a scenario information storing unit 47. The request processing unit 41 functions as a request accepting unit, the player management unit 44 functions as a referring unit, the request processing unit 41 functions as a status obtaining unit in cooperation with the player management unit 44, and the request processing unit 41 functions as a screen transition information obtaining unit in cooperation with the scenario information management unit 46.

The request processing unit 41 has a function to receive a request from the terminal device 1, perform a corresponding process and send a processed result of the request to the terminal device 1 as a response. In this embodiment, the request processing unit 41 further has a function to obtain respective screen transition information via the scenario information management unit 46 and sends the obtained screen transition information (and screen information in accordance with necessity) to the terminal device 1 with the processed result of the request as the response.

When the request processing unit 41 receives the request of updating, the request processing unit 41 performs an operation to update the player information, and sends the player information or the like which is changed by the operation as the processed result. When the request processing unit 41 receives the request of referring to data, the request processing unit 41 refers to the player information, and sends an obtained value of the player information as the processed result. The operation of obtaining the screen transition information is explained later in detail.

The game parameter management unit 42 has a function to manage game parameters, which relate to operations of a game such as a probability or the like for a reward given to a player when the player clears a mission or the like in the game, stored in the game parameter storing unit 43.

The player management unit 44 has a function to manage various information items about all of the players participating in the game, which are stored in the player information database 45. An example of the data structure of the player information is explained later in detail.

The scenario information management unit 46 has a function to manage scenario information which is a collection of screen transitions and is stored in the scenario information storing unit 47. An example of the data structure of the scenario information is explained later in detail.

Figure 5:
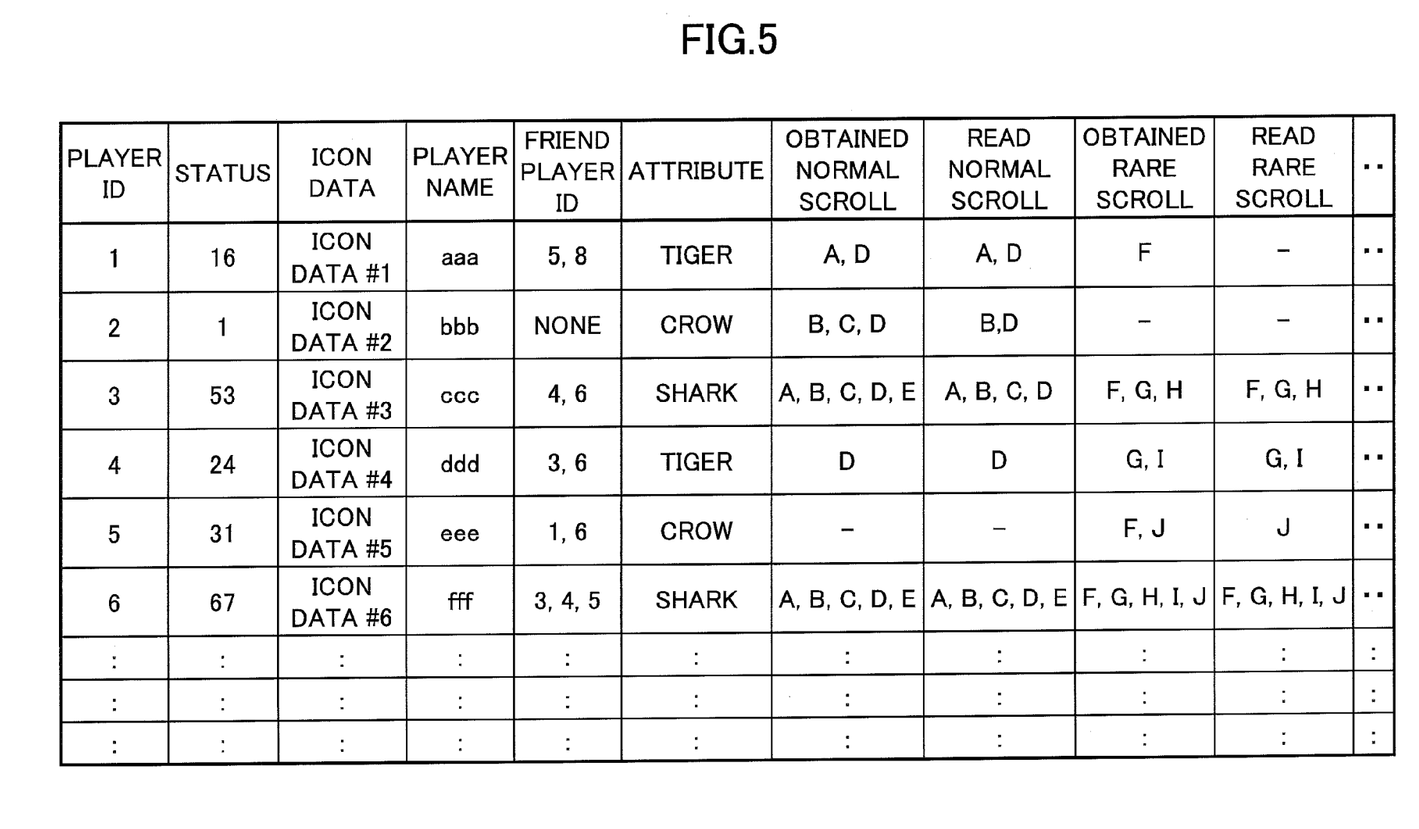
FIG. 5 is a view showing an example of a data structure of player information stored in a player information database.

FIG. 5 is a view showing an example of a data structure of the player information stored in the player information database 45.

In FIG. 5, the player information includes items (fields) such as "player ID", "status", "icon data", "player name", "friend player ID", "attribute", "obtained normal scroll", "read normal scroll", "obtained rare scroll", "read rare scroll" and the like.

The "player ID" is data to specify (identify) the player. The "status" is data to specify a status of the player in the game. The "icon data" is data to specify a displayed icon of the player. The "player name" is data indicating displayed name of the player. The "friend player ID" is data to specify the other players whom the player registers as friend players. The "attribute" is data indicating a type, selected by the player at a start of the game, of the player.

The "obtained normal scroll" is data to specify a normal (not rare) scroll (item) obtained by the player or given by the other players. The "read normal scroll" is data to specify the normal scroll which is read (comprehended) by the player after performing a predetermined operation among the obtained normal scrolls. The "obtained rare scroll" is data to specify a rare scroll obtained by the player or given by the other players. The "read rare scroll" is data to specify the rare scroll which is read (comprehended) after performing a predetermined operation among the obtained rare scrolls.

Figure 6:
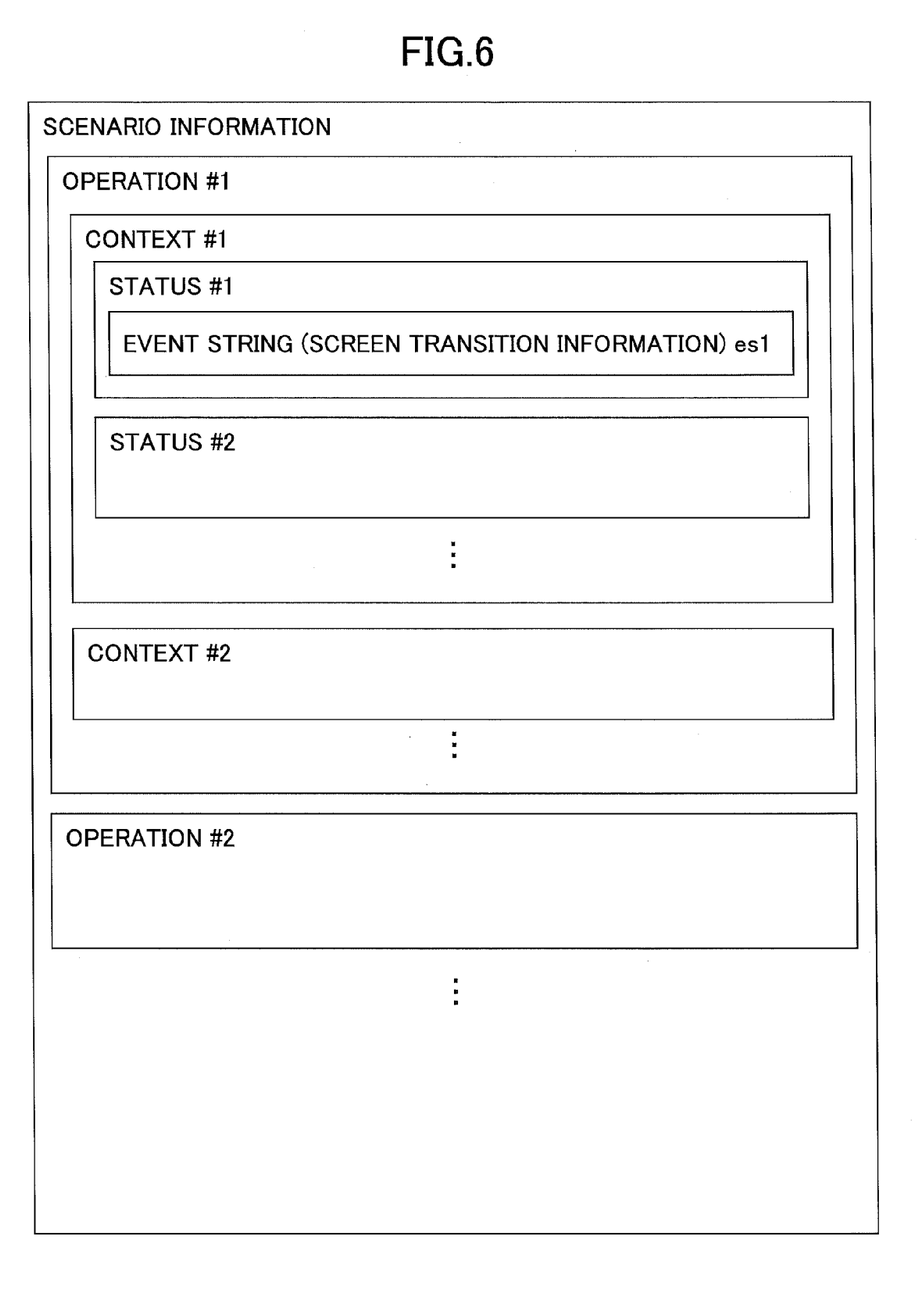
FIG. 6 is a view showing an example of a data structure of scenario information.

FIG. 6 is a view showing an example of a data structure of the scenario information stored in the scenario information storing unit 47.

In FIG. 6, the scenario information is divided into layers of "operation", "context", and "status". The scenario information further includes "event string", which is the screen transition information, and is in correspondence with the lowest "status".

The "operation" is data to specify the operation content such as "send item" or the like. The "context" is data to specify a target screen among a series of screens related to the respective "operation". When the series of the screens related to the "operation" includes only one screen, the "context" may be omitted. The "status" is data to specify the status of the player in the game.

Specifically, the scenario information includes plural sets of operation data. Each set of the operation data includes plural sets of context data, and each set of the context data includes plural sets of status data which is in correspondence with the event string. For example, the operation data #1 includes context data #1, #2, . . . . The context data #1 includes status data #1, #2, . . . . The status data #1 is in correspondence with the event string (screen transition information) es1. The "event string" is explained in the following.

Figure 7:
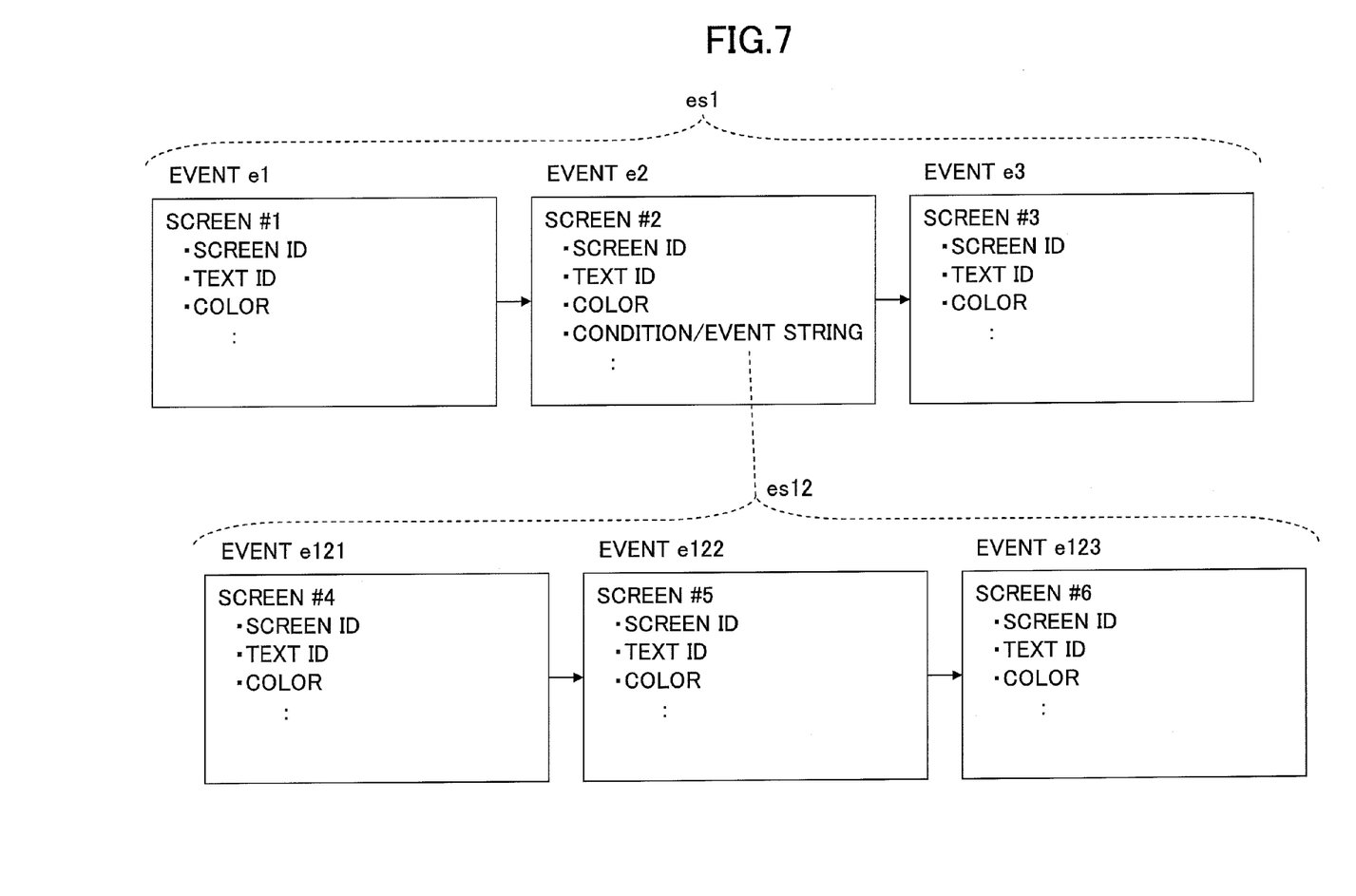
FIG. 7 is a view showing an example of a data structure of an event string.

FIG. 7 is a view showing an example of a data structure of the event string.

In FIG. 7, the event string includes aligned plural events corresponding to screens. Each of the events includes items such as "screen ID", "text ID", "color" and the like. The "screen ID" is data to specify a screen to be displayed. The "text ID" is data to specify a character string which is displayed in a screen. The character string may be directly included in the event without using the text ID. The "color" is data to specify the color of the text or the like.

Each of the events included in the event string may further include "condition/event string". The "condition/event string" includes a branch condition from which the game story is branched and an event string which is to occur after the branch condition is satisfied or selected. Each of the events included in the event string may include plural sets of "condition/event string".

In FIG. 7, the event string es1 is exemplified. The event string es1 includes plural events e1 to e3 and the like. The event e2 includes the item of the "condition/event string". Specifically, the event e2 includes an event string es12 which further includes events e121, e122, e123 and the like. Thus, even when the event e2 includes a branch condition, the successive event(s) after the branch condition is satisfied or selected is also included in the event string (screen transition information) sent from the social game processing server apparatus 4. Therefore, it is unnecessary for the terminal device to access the social game processing server apparatus 4 when the branch condition is satisfied or selected.

(Operation)

Figure 8:
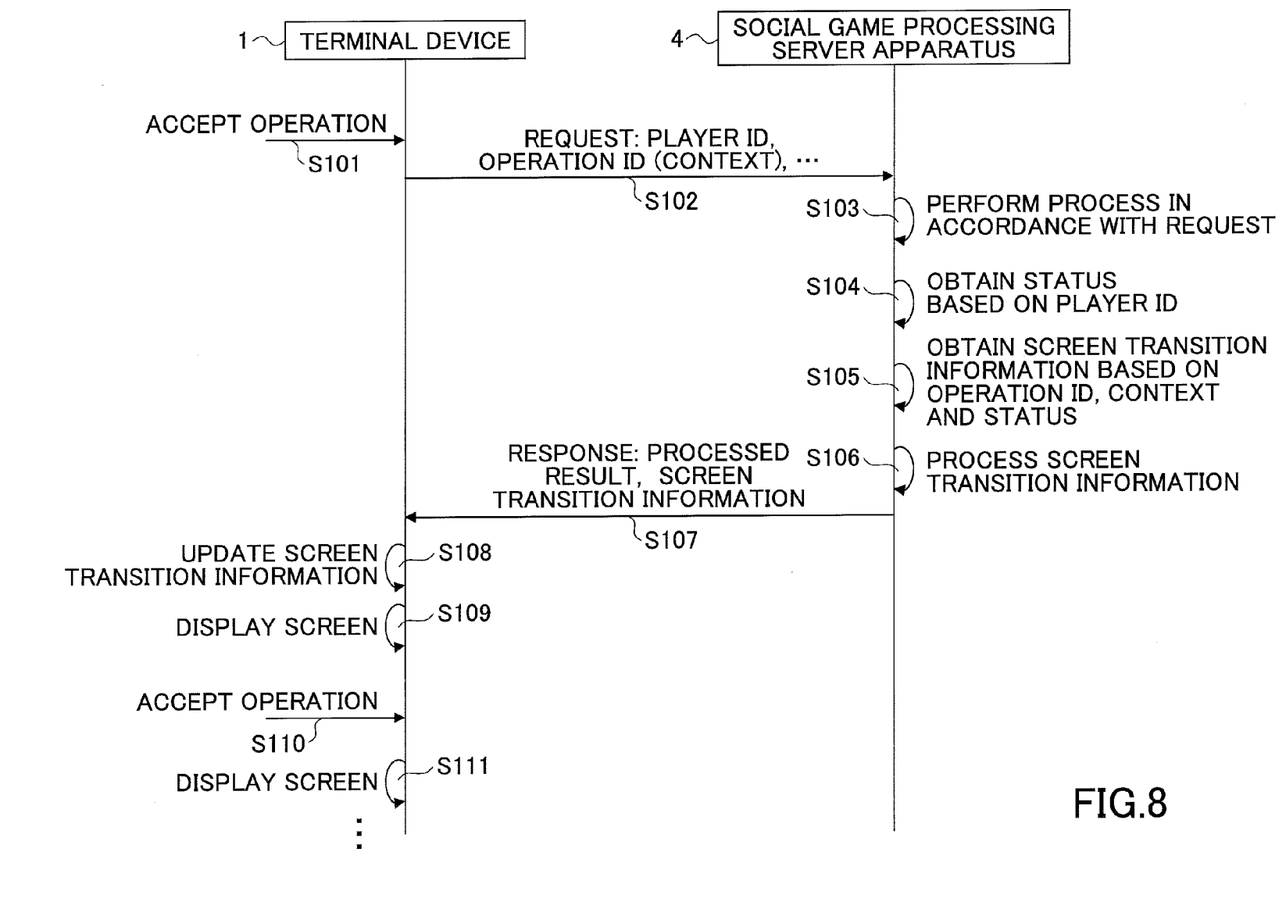
FIG. 8 is a sequence diagram showing an example of an operation when the terminal device accesses the social game processing server apparatus.

FIG. 8 is an example of a sequence diagram showing an example of an operation when the terminal device 1 accesses the social game processing server apparatus 4. In the following, the operations of the request processing unit 41 to access (update) data stored in the game parameter storing unit 43, the player information database 45, and the scenario information storing unit 47 are performed via the game parameter management unit 42, the player management unit 44, and the scenario information management unit 46, respectively, unless otherwise explained.

At the terminal device 1, when the player operation input unit 12 accepts an operation by the player (step S101), and the game logic processing unit 13 determines to access the social game processing server apparatus 4, the server accessing unit 14 sends a request including the player ID and the operation ID (and context in accordance with necessity), to the social game processing server apparatus 4 (step S102).

At the social game processing server apparatus 4, the request processing unit 41 performs the process in accordance with the request obtained from the terminal device 1 (step S103). It means that when the request includes a request for updating, the request processing unit 41 performs a process to update the player information. At this time, a processed result is the updated player information or the like. When the request includes a request of referring to data, the request processing unit 41 refers to the player information and obtains the player information. At this time, the processed result is the obtained player information.

Then, the request processing unit 41 obtains a current status of the player which is in correspondence with the player ID from the player information database 45 based on the player ID obtained with the request from the terminal device 1 (step S104).

Then, the request processing unit 41 obtains the screen transition information, which is the event string, from the scenario information stored in the scenario information storing unit 47 based on the operation ID and the context obtained with the request and the status of the player obtained in step S104 (step S105).

More specifically, with reference to FIG. 6, the scenario information management unit 46 specifies the operation data based on the operation ID, specifies the context data based on the obtained context, and specifies the status data based on the obtained status to specify the event string. Then, the scenario information management unit 46 obtains the specified event string as the screen transition information.

Referring back to FIG. 8, the request processing unit 41 processes the obtained screen transition information to have a format interpretable by the terminal device 1 (step S105). For example, the request processing unit 41 generates an original markup by introducing data into an original markup template, which is similar to a method of generating an HTML data document by introducing data into an HTML data document template in the browser type game processing method.

Then, the request processing unit 41 sends the processed result of the request and the screen transition information to the terminal device 1 as a response to the request (step S107).

At the terminal device 1, upon receiving the response from the social game processing server apparatus 4, the server accessing unit 14 transfers the processed result to the game logic processing unit 13, and transfers the screen transition information to the screen transition information updating unit 15. Then, the screen transition information updating unit 15 updates (reflects) the current screen transition information by the received screen transition information (step S108).

Then, the game logic processing unit 13 determines a screen based on the processed result and the updated screen transition information so that the screen display unit 17 displays the screen (step S109).

Thereafter, when the player operation input unit 12 accepts an operation by the player (step S110), when it is unnecessary to access the server, the game logic processing unit 13 determines the next screen based on the screen transition information to be displayed by the screen display unit 17 (step S111). The same operation is repeated.

Figure 9:
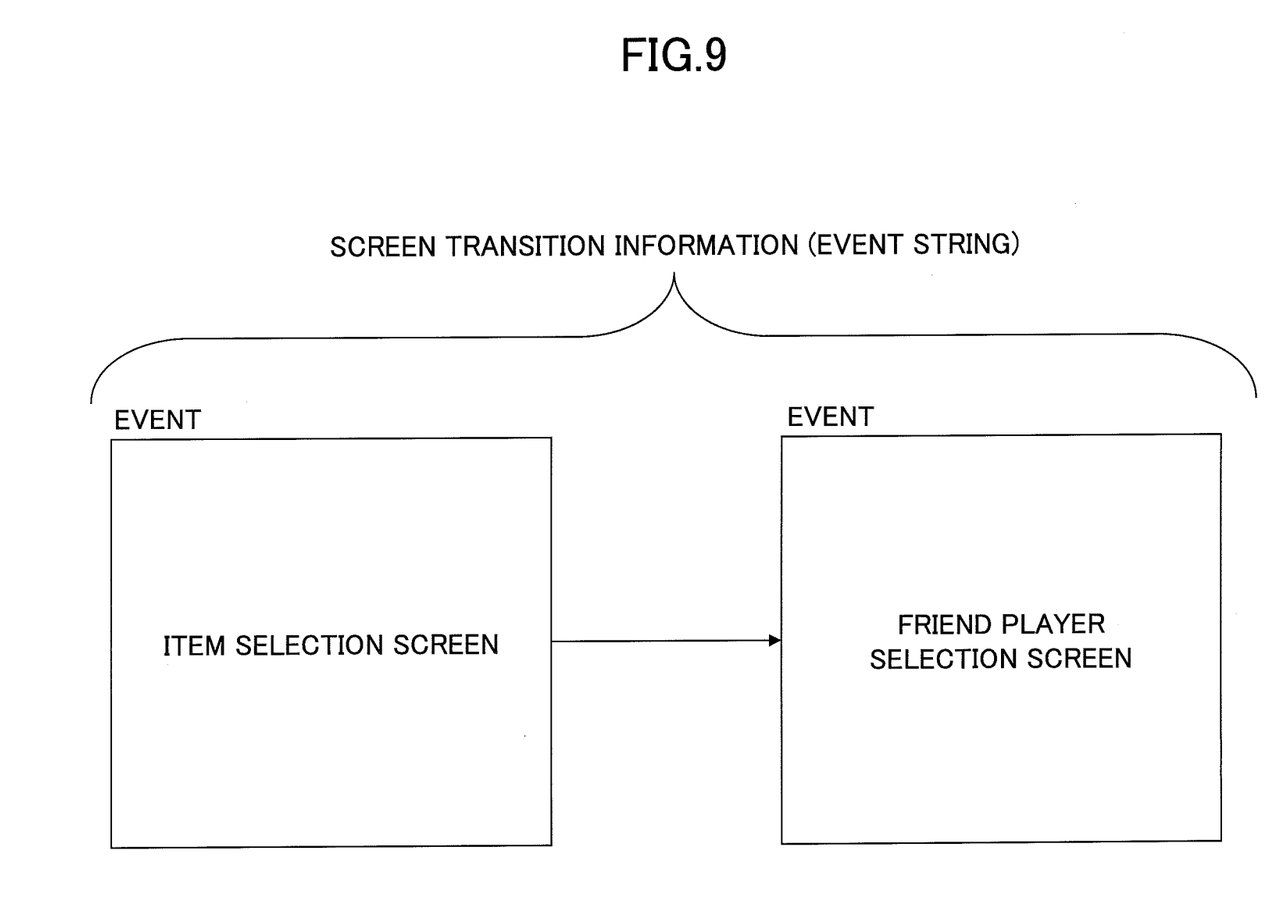
FIG. 9 is a view showing an example of screen transition information.

FIG. 9 is a view showing an example of the screen transition information (event string).

In FIG. 9, two events "item selection screen" and "friend player selection screen" are shown as the newly obtained screen transition information in accordance with the operation "send item" (an operation to start a process of sending an item) by the player.

Figure 10A:
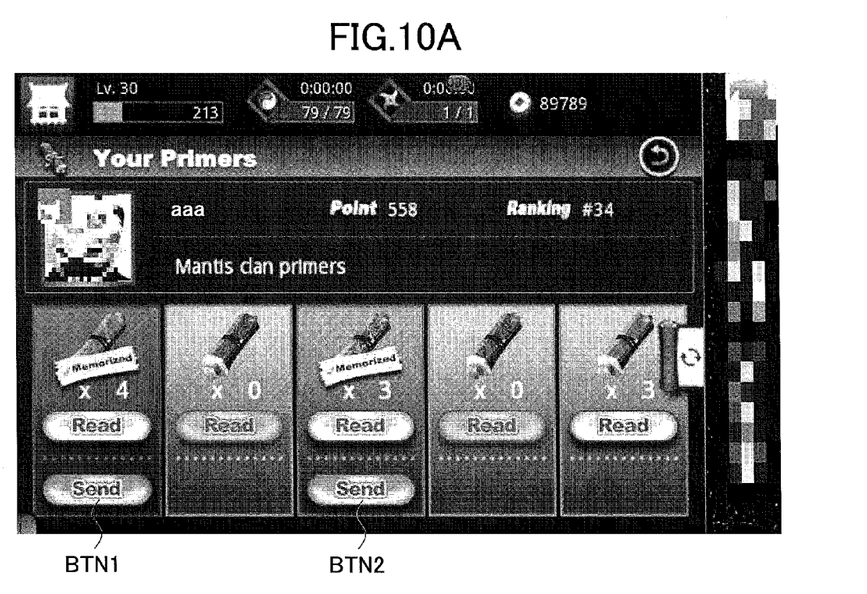
FIG. 10A is a view showing an example of an item selection screen.
Figure 10B:
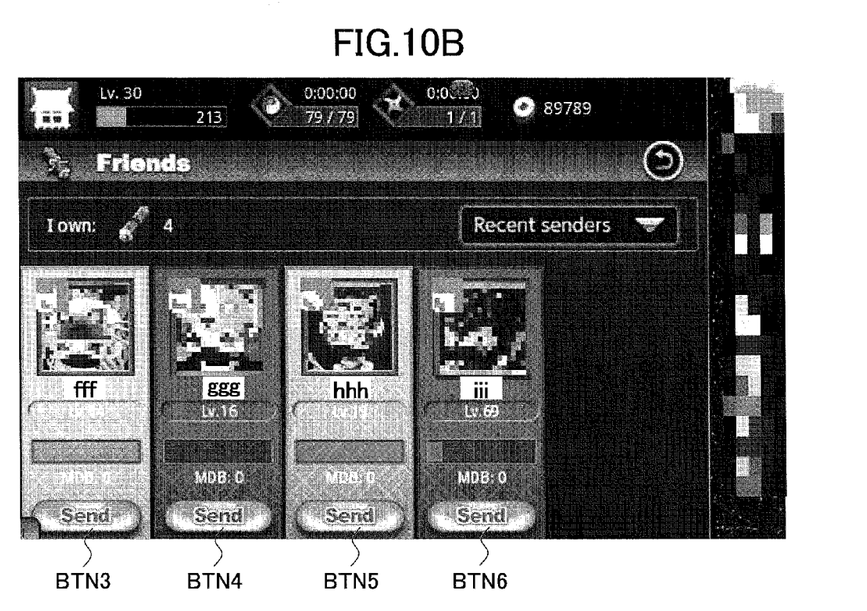
FIG. 10B is a view showing an example of a friend player selection screen.

FIG. 10A and FIG. 10B are views showing an example of screens which are displayed in accordance with the screen transition information shown in FIG. 9. FIG. 10A shows an example of the item selection screen and FIG. 10B shows an example of the friend player selection screen.

In the item selection screen shown in FIG. 10A, the obtained scrolls are displayed at the lower part and "Send" buttons BTN1 and BTN2 are displayed for the read scrolls. When the player taps (touches) either of the buttons, the item to send (to give to another player) is selected. Then, the screen transitions to the friend player selection screen shown in FIG. 10B.

In the friend player selection screen shown in FIG. 10B, the friend players are displayed at the lower part and "Send" buttons BTN3 to BTN6 are displayed for the players, respectively. When the player taps either of the buttons, the player can select a friend player to whom the item is sent.

Referring also to FIG. 7, the item selection screen shown in FIG. 10A corresponds to the event e2 included in the event string es1, which includes a branch condition (items (scrolls) to be selected), and an event string which is to be displayed after the branch condition is satisfied. Thus, in this case, the friend player selection screen shown in FIG. 10B corresponds to the event string es12.

As described above, according to the embodiment, the following advantages can be obtained.

(1) In a general application type game, it is impossible to change the screen defined in the initially downloaded application software. Thus, it is necessary to download new application software in order to change the screen. However, according to the embodiment, screen transition information (a series of screens related to an operation of a player), screen information, and further a program can be updated by changing the scenario information so that the screen can be dynamically changed.

(2) Further, by updating only the screen transition information, not the screen information or the program, the traffic can be drastically reduced.

According to the game processing server apparatus, the program for the game processing server apparatus or the program for the terminal device, the screen transition information is generated at the game processing server apparatus every time the request is sent from the terminal device, and the generated screen transition information is sent to the terminal device. Thus, a game processing technique which basically processes a social game as an application type and is capable of dynamically generating screen information similar to a browser type is provided.

Although a preferred embodiment of the game processing server apparatus and the terminal device has been specifically illustrated and described, it is to be understood that minor modifications may be made therein without departing from the spirit and scope of the invention as defined by the claims.

The individual constituents of the game processing server apparatus 4 and the terminal device 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

The following structures may be included.

A game processing server apparatus connected to a terminal device via a network includes:

a unit which accepts a request of updating or referring to player information from the terminal device which is generated under control of a game application program executed in the terminal device upon an operation of a player of the terminal device, updates or refers to the player information, and obtains screen transition information in which display control content of a series of screens in accordance with a processed result of the request is described for updating screen transition information accompanied by the game application program of the terminal device from scenario information based on an operation content and a status of the player who has sent the request; and a unit which sends the processed result of the request and the screen transition information to the terminal device which has sent the request.

In the game processing server apparatus, the scenario information is divided into layers of an operation content, a context, and a status.

In the game processing server apparatus, screen information of a screen which is to be displayed by the screen transition information is also sent to the terminal device with the screen transition information.

A program for a game processing server apparatus, which is configured to function a computer composing a game processing server apparatus connected to a terminal device via a network, as a unit which accepts a request of updating or referring to player information from the terminal device which is generated under control of a game application program executed in the terminal device upon an operation of a player of the terminal device, updates or refers to the player information, and obtains screen transition information in which display control content of a series of screens in accordance with a processed result of the request is described for updating screen transition information accompanied by the game application program of the terminal device from scenario information based on an operation content and a status of the player who has sent the request; and a unit which sends the processed result of the request and the screen transition information to the terminal device which has sent the request.

A program for a terminal device, which is configured to function a computer composing a terminal device connected to a game processing server apparatus via a network, as a unit which sends a request including a request of updating or referring to player information to the game processing server apparatus based on an operation by a player;

a unit which receives from the game processing server apparatus a processed result of the update or reference to the player information in accordance with the request, and screen transition information in which display control content of a series of screens in accordance with the processed result obtained from scenario information based on an operation content and a status of the player who has sent the request;

a unit which updates screen transition information stored in the terminal device by the received screen transition information; and a unit which displays a screen based on the received processed result and the updated screen transition information.

The present invention is not limited to the specifically disclosed embodiments, and variations and modifications may be made without departing from the scope of the present invention.

The present application is based on Japanese Priority Application No. 2012-103453 filed on Apr. 27, 2012, the entire contents of which are hereby incorporated by reference.

What is claimed is:

1. A game processing server apparatus connected to a terminal device via a network, comprising:

a request accepting unit which accepts a request from the terminal device which is generated under control of a game application program executed in the terminal device upon an operation of a player of the terminal device, the request including player identification data and operation identification data related to the operation of the player;

a referring unit which updates or refers to player information stored in a player information database based on the request accepted by the request accepting unit;

a status obtaining unit which obtains a status of the player from the player information database based on the player identification data accepted by the request accepting unit;

a screen transition information obtaining unit which obtains screen transition information from scenario information stored in a scenario information storing unit, the screen transition information describing display control content of a series of screens in accordance with a processed result of the request accepted by the request accepting unit based on the operation identification data and the status for updating screen transition information accompanied by the game application program of the terminal device, the screen transition information including an event string in which events corresponding to the series of screens are aligned, and each of the events including data to specify content of the screen, and for a case where a screen transition occurs in the event, a branch condition and an event string which is to occur after the branch condition is satisfied; and a sending unit which sends the processed result of the request accepted by the request accepting unit and the screen transition information obtained by the screen transition information obtaining unit to the terminal device which has sent the request, as a response to the request accepted by the request accepting unit.

2. The game processing server apparatus according to claim 1, wherein the scenario information is divided into layers of an operation content, a context, and a status.

3. The game processing server apparatus according to claim 1, wherein screen information of a screen which is to be displayed by the screen transition information is also sent to the terminal device with the screen transition information.

4. A non-transitory computer-readable recording medium having recorded thereon a program that causes a computer, which composes a game processing server apparatus connected to a terminal device via a network, to execute a method comprising:

accepting a request from the terminal device which is generated under control of a game application program executed in the terminal device upon an operation of a player of the terminal device, the request including player identification data and operation identification data related to the operation of the player;

updating or referring to player information stored in a player information database based on the request accepted in the accepting;

obtaining a status of the player from the player information database based on the player identification data accepted in the accepting;

obtaining screen transition information from scenario information stored in a scenario information storing unit, the screen transition information describing display control content of a series of screens in accordance with a processed result of the request accepted in the accepting based on the operation identification data and the status for updating screen transition information accompanied by the game application program of the terminal device, the screen transition information including an event string in which events corresponding to the series of screens are aligned, and each of the events including data to specify content of the screen, and for a case where a screen transition occurs in the event, a branch condition and an event string which is to occur after the branch condition is satisfied; and sending the processed result of the request accepted in the accepting and the screen transition information obtained in the obtaining the screen transition information to the terminal device which has sent the request, as a response to the request accepted in the accepting.

5. A non-transitory computer-readable recording medium having recorded thereon a game application program that causes a computer, which composes a terminal device connected to a game processing server apparatus via a network, to execute a method comprising:

sending a request including a request of updating or referring to player information to the game processing server apparatus based on an operation by a player;

receiving from the game processing server apparatus a processed result of the request sent to the game processing server apparatus, and screen transition information that describes display control content of a series of screens in accordance with the processed result obtained from scenario information based on operation identification data of the operation and a status of the player as a response to the request sent to the game processing server apparatus,     the screen transition information including an event string in which events corresponding to the series of screens are aligned, and     each of the events including data to specify content of the screen, and for a case where a screen transition occurs in the event, a branch condition and an event string which is to occur after the branch condition is satisfied;

updating screen transition information accompanied by the game application program stored in the terminal device by the received screen transition information; and     displaying a screen based on the received processed result and the updated screen transition information.

\* \* \* \* \*